United States Patent Office 2,706,721
Patented Apr. 19, 1955

2,706,721

INTERPOLYMERS OF ACRYLONITRILE AND ESTERS OF BICYCLO - [2,2,1] - 5 - HEPTENE CARBOXYLIC ACIDS

John R. Caldwell, Kingsport, Tenn., assignor to Eastman Kodak Company, Rochester, N. Y., a corporation of New Jersey No Drawing. Application August 19, 1953, Serial No. 375,285

12 Claims. (Cl. 260—32.6)

This invention relates to interpolymers of acrylonitrile and alkyl esters of bicyclo-[2,2,1]-5-heptene carboxylic acids and to articles obtained therefrom.

It is known that bicyclo-[2,2,1]-5-heptene carboxylic acid (3,6-endomethylene 1,2,3,6 tetrahydrophthalic acid) and certain derivatives thereof can be copolymerized with certain other unsaturated polymerizable compounds to give resinous products. These previously known resinous copolymers have not, however, been found suitable for preparing high quality synthetic fibers for one reason or another, but principally because such polymers have generally had too low softening points, poor elasticity and were not readily dyeable by commercially available dyes.

I have now found that high quality fibers can be made from resinous polymers prepared by interpolymerizing certain proportions of acrylonitrile with bicyclo-[2,2,1]-5-heptene carboxylic acid alkyl esters. The fibers produced from my new polymers show excellent tenacity, elongation and elastic recovery, as well as good affinity for commerciay dyes such as cellulose acetate dyes and have unusually high melting or softening points. Whereas interpolymers of acrylonitrile containing more than about 12 to 15 per cent of another monomer generally soften below 200° C., thereby severely limiting their use in synthetic fibers. I have found that as much as 15 to 20 per cent of the bicycloheptene derivative of my invention can be present in an interpolymer with acrylonitrile and the product softens only at the much higher temperatures of from about 215° to 230° C. These properties together with improved solubility over a wider range of solvents, as compared with polyacrylonitrile, make my new resinous polymers outstanding, especially for fiber-forming purposes.

It is, accordingly, an object of my invention to provide a new class of acrylonitrile polymers. A further object is to provide methods for preparing such polymers. Still another object is to provide homogeneous solutions comprising these polymers. Another object is to provide synthetic fibers from these polymers and their solutions. Other objects will become apparent from a consideration of the following description and examples.

In accordance with my invention, I provide resinous interpolymers comprising from 65 to 95% by weight of acrylonitrile and from 35 to 5% by weight of a bicycloheptene derivative selected from those represented by the following general formula:

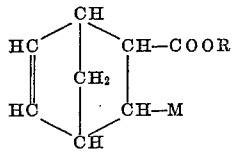

wherein R represents an alkyl group and M represents a hydrogen atom or the group —COOR₁ wherein R₁ represents a hydrogen atom or an alkyl group containing from 1 to 4 carbon atoms, by heating in the presence of a polymerization catalyst a mixture comprising acrylonitrile and the bicycloheptene derivative, in proportions about the same as set forth above. Preferably my new polymers contain from 70 to 80% by weight of acrylonitrile and from 30 to 20% by weight of the bicycloheptene derivative. If desired, a minor portion of another monomer, from 1% up to about 8% based on the total weight of the monomers, such as acrylamide, methacrylamide and their N-methyl, N-ethyl, N-propyl and N-butyl derivatives can be added to the polymerization mixtures to obtain the corresponding ternary polymers.

In this case, the acrylonitrile always comprises from 70 to 80% of the total weight of the interpolymer, while the bicycloheptene compound comprises from 29 to 12% of the total weight of the interpolymer. However, the preferred polymers of my invention are the copolymers. In general, those of my polymers containing up to 20% by weight of the bicycloheptene derivative give fibers that stick to the hot bar at temperatures about 200° C. and usually in the range of 215° to 230° C. Polymers of my invention which contain more than 20% of the bicycloheptene derivative have somewhat lower sticking temperatures. Polymers containing less than 5% of the bicycloheptene derivative, the remainder being acrylonitrile, tend to be brittle and less soluble, and are unsuitable for preparing the articles of my invention.

Typical bicycloheptene derivatives which may be used in practicing my invention include bicyclo-[2,2,1]-5-heptene-2,3-dicarboxylic acid dimethyl ester, bicyclo-[2,2,1]-5-heptene-2,2-dicarboxylic acid diethyl ester, bicyclo-[2,2,1]-5-heptene-2,3-dicarboxylic acid dipropyl ester, bicyclo-[2,2,1]-5-heptene-2,3-dicarboxylic acid diisopropyl ester, bicyclo-[2,2,1]-5-heptene-2,3-dicarboxylic acid dibutyl ester, bicyclo-[2,2,1]-5-heptene-2,3-dicarboxylic acid methyl ester, bicyclo-[2,2,1]-5-heptene-2,3-dicarboxylic acid butyl ester, bicyclo-[2,2,1]-5-heptene-2-carboxylic acid methyl ester, bicyclo-[2,2,1]-heptene-2-carboxylic acid ethyl ester, bicyclo-[2,2,1]-5-heptene-2-carboxylic acid propyl ester, bicyclo-[2,2,1]-5-heptene-2-carboxylic acid isopropyl ester, bicyclo-[2,2,1]-5-heptene-2-carboxylic acid butyl ester, and the like. Mixtures of the above bicycloheptene esters can be employed for the copolymerizations, the total not exceeding the proportions of from 5 to 35 parts by weight of the bicycloheptene compounds to each 95 to 65 parts by weight of acrylonitrile.

The bicycloheptene derivatives are conveniently made by Diels-Alder reactions with cyclopendiene and α,β-unsaturated acid esters. When acrylic esters are employed, the monocarboxylic acid derivative is obtained. When maleic or fumaric esters are used, the dicarboxylic acid derivatives are obtained. Maleic anhydride can be employed to advantage, as well as maleic esters.

The polymerizations for preparing the new resinous polymers of the invention can be carried out in mass, in solution in an organic solvent such as acetone, acetonitrile, ethyl alcohol, tertiary butyl alcohol, etc., or in aqueous dispersion, in the presence of a polymerization catalyst. Heat and actinic light also accelerate the polymerizations. Peroxide catalysts which are soluble in the monomers or in the solvent mediums for the polymerization can be used, e. g. organic and inorganic peroxides such as benzoyl peroxide, acetyl peroxide, lauroyl peroxide, hydrogen peroxide, persulfates e. g. alkali metal persulfates such as sodium and potassium persulfates, ammonium persulate, etc., perborates, e. g. alkali metal perborates such as sodium and potassium perborates, ammonium perborate, etc. Azo-bis-nitrliles are also effective polymerization catalysts. Mixtures of catalysts can be employed. The amount employed of such catalyst can be varied over a wide range, but advantageously from about 0.01 to 2.0 per cent or even more, based on the total weight of the monomers to be polymerized. Normal pressures are generally employed; however, good results are also obtainable at pressures below and above normal atmospheric pressures. The temperature at which the polymerizations are carried out can vary from 30° to 100° C. and preferably from 50° to 70° C. Batch or continuous processes can be employed. Where a continuous process is desirable, the monomers and other substituents making up the reaction mixture can be added to the reaction system in continuous manner and the polymer withdrawn from the system as formed.

The preferred method is to polymerize the monomers in aqueous dispersion, in the presence of a surface active agent and a polymerization catalyst which is water-soluble such as potassium persulfate, sodium persulfate, sodium perborate, hydrogen peroxide, etc. In this case, reducing agents such as alkali metal sulfites and bisulfites e. g. sodium, potassium, etc. sulfites and metabisulfites can be added to the polymerization reaction mixture in about the same amount as the polymerization catalyst to reduce the time required to effect polymerization. If desired, chain regulators can also be employed such as hexyl, cetyl, lauryl, myristyl, etc. mercaptans. Suitable surface active agents include fatty acid soaps, fatty alcohol sulfates such as sodium lauryl sulfate, potassium lauryl sulfate, etc., alkali metal salts of aromatic sulfonic acids e. g. sodium isobutylnaphthalene sulfonate, sulfosuccinic esters, ethylene oxide condensation products, sulfonated fatty acid amides, alkali metal salts of alkane sulfonic acids, sulfonated ethers, and the like. Mixtures of these surface active agents can also be employed.

The following examples will serve further to illustrate the manner whereby I practice my invention.

*Example 1*

A mixture of 18.0 g. of acrylonitrile, 6.0 g. of bicyclo-[2,2,1]-5-heptene-2,3-dicarboxylic acid dimethyl ester, 0.3 g. of sodium tetradecyl sulfate, 0.3 g. of potassium persulfate and 90 cc. of water was tumbled at 50–55° C. for a period of 24 hours. The resulting emulsion was coagulated with sodium sulfate and the copolymer which precipitated was washed with water and acetone. A yield of 10–12 g. was obtained. The copolymer contained 20.4% by weight of nitrogen, which corresponds to approximately 78% by weight of acrylonitrile, the remainder of the copolymer being bicyclo-[2,2,1]-5-heptene-2,3-dicarboxylic acid dimethyl ester. The copolymer was soluble not only in the solvents commonly used for dissolving polyacrylonitrile but was also soluble in less active solvents such as in diethylacetamide and in a mixture of 2 parts by weight of acrylonitrile and 1 part by weight of dimethylformamide.

8 parts by weight of the above prepared resinous copolymer were dissolved in 40 parts by weight of dimethylformamide and the solution then extruded through a multi-hole spinneret into a coagulating bath consisting of 75 parts by weight of water and 25 parts by weight of dimethylformamide. After drying and drafting, the fibers obtained had a tensile strength of 2.0–2.5 grams per denier and elongation of 18–20%. They stuck to the hot bar at 210–220° C., which value is relatively high for an interpolymer containing only 78% by weight of acrylonitrile. The fibers dyed to heavy shades by cellulose acetate dyes applied in a dye bath heated to 94–96° C.

In place of the bicyclo-[2,2,1]-5-heptene-2,3-dicarboxylic acid dimethyl ester in the above example, there was substituted a like amount of bicyclo-[2,2,1]-5-heptene-2,3-dicarboxylic acid diethyl ester and in another case a like amount of bicyclo-[2,2,1]-5-heptene-2,3-dicarboxylic acid dipropyl ester to give generally similar resinous copolymers having relatively high sticking temperatures and good solubility in diethylacetamide and in mixtures of acetonitrile and dimethylformamide, and from which solutions excellent fibers can be prepared.

*Example 2*

16 g. of acrylonitrile, 8 g. of bicyclo-[2,2,1]-5-heptene-2,3-dicarboxylic acid dimethyl ester and 0.2 g. of azobisisobutyronitrile were placed in a glass tube, the tube flushed with nitrogen and sealed. It was allowed to stand at 50° C. for 36 hours. A hard, opaque polymer was obtained. It was ground to a powder, washed with acetone and dried. Analysis showed this product to contain 19.8% by weight of nitrogen, corresponding to a copolymer containing approximately 75% by weight of acrylonitrile and 25% by weight of bicyclo-[2,2,1]-5-heptene-2,3-dicarboxylic acid dimethyl ester. The copolymer was soluble in a mixture of 2 parts by weight of acetonitrile and 1 part by weight of dimethylformamide. The product can be cast into continuous, tough films from its solution. It was also extrudible into filaments and fibers and moldable into stable, shaped articles

*Example 3*

A mixture of 16 g. of acrylonitrile, 8 g. of bicyclo-[2,2,1]-5-heptene-2,3-dicarboxylic acid dimethyl ester, 0.5 g. of sodium dodecyl sulfate, 0.3 g. of potassium persulfate and 200 cc. of water was agitated at 50° C. for 48 hours. A yield of 16 g. of resinous product containing 18.5% nitrogen was obtained. This indicated that a copolymer had been obtained which consisted of 70.2% by weight of acrylonitrile and 29.8% by weight of bicyclo-[2,2,1]-5-heptene-2,3-dicarboxylic acid dimethyl ester. The product was useful for the preparation of fibers, films and molded objects.

*Example 4*

A mixture of 15 g. of acrylonitrile, 5 g. of bicyclo-[2,2,1]-5-heptene-2-carboxylic acid methyl ester, 0.3 g. of sulfonated mineral oil, 0.2 g. of potassium persulfate and 200 cc. of water was agitated at 50°–55° C. for 24 hours. A yield of approximately 11 g. of resinous copolymer was obtained which by analysis was shown to contain 19.3% nitrogen, corresponding to approximately 73.5% by weight of acrylonitrile and 26.5% by weight of bicyclo-[2,2,1]-5-heptene-2-carboxylic acid methyl ester. The product was soluble in dimethylformamide, gamma-butyrolactone, ethylene carbonate, etc. from which solutions excellent fibers were obtained by extrusion into coagulating baths.

In place of the bicyclo-[2,2,1]-5-heptene-2-carboxylic acid methyl ester, there was substituted a like amount of bicyclo-[2,2,1]-5-heptene-2-carboxylic acid butyl ester to give a resinous copolymer having approximately the same ratio of components i. e. approximately 73.5% by weight of acrylonitrile and 26.5% by weight of bicyclo-[2,2,1]-5-heptene-2-carboxylic acid butyl ester, and giving similarly good solutions and fibers therefrom.

*Example 5*

A mixture of 40 g. of acrylonitrile, 4 g. of N-methyl methacrylamide, 6 g. of bicyclo-[2,2,1]-5-heptene-2,3-dicarboxylic acid dimethyl ester, 1 g. of sodium lauryl sulfate and 0.6 g. of potassium persulfate was agitated at 50° C. for 20 hours. Another portion of 0.3 g. of potassium persulfate was added and agitation continued for 24 hours longer. The yield of polymer was 45–48 g. Analysis indicated that the polymer was a terpolymer consisting of acrylonitrile, N-methyl methacrylamide and bicyclo-[2,2,1]-5-heptene-2,3-dicarboxylic acid dimethyl ester in approximately the proportions contained in the starting polymerization mixture. Fibers spun from this terpolymer had a sticking temperature on the hot bar at 210–220° C. They were heavily dyed by cellulose acetate dyes. They were also dyeable with acid wool dyes, vat dyes and direct cotton dyes.

In place of the N-methyl methacrylamide in the above example, there can be substituted a like minor amount of other polymerizable unsaturated monomers such as acrylamide, methacrylamide, N-alkyl acrylamides and other N-alkyl methacrylamides, wherein the alkyl group contains from 1 to 4 carbon atoms, to give generally similar terpolymers as described in the above example.

By varying the proportions of polymerizable components in the above examples, other resinous polymers of my invention coming within the range of from 65 to 95% by weight of acrylonitrile and from 35 to 5% by weight of the mentioned bicycloheptene derivatives, with or without a minor portion of an unsaturated amide such as acrylamide, methacrylamide, etc., can be prepared. All of the polymeric products of my invention are soluble in one or more solvents commonly used for dissolving polyacrylonitrile such as dimethylformamide, dimethylacetamide, gamma-butyrolactone, ethylene carbonate, ethylene cyanohydrin and succinodinitrile. Those of my new polymers containing more than about 16% by weight of the bicycloheptene derivative are, in addition, soluble in less active solvents and solvent mixtures such as diethylformamide, diethylacetamide, valerolactone, and a mixture of 2 parts by weight of acetonitrile and 1 part by weight of dimethylformamide.

The solutions or dopes of the polymers in one or more of the above mentioned solvents can be readily spun to fibers by wet spinning or dry spinning methods or cast onto smooth surfaces to give films, sheets, etc., which are useful as photographic film supports or bases. The polymers of the invention can also be molded by injection or comprusion methods into stable, shaped articles. Such solutions or compositions can, if desired, have incorporated therein suitable plasticisers, fillers, dyes, and the like.

What I claim is:

1. A polymer comprising from 65 to 95% by weight of acrylonitrile and from 35 to 5% by weight of a compound selected from the group consisting of those represented by the following general formula:

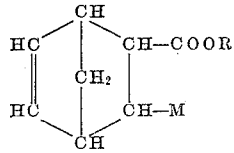

wherein R represents an alkyl group containing from 1 to 4 carbon atoms and M represents a member selected from the group consisting of a hydrogen atom and the group —COOR₁ wherein R₁ represents a member selected from the group consisting of a hydrogen atom and an alkyl group containing from 1 to 4 carbon atoms.

2. A copolymer of from 70 to 80% by weight of acrylonitrile and from 30 to 20% by weight of bicyclo-[2,2,1]-5-heptene-2,3-dicarboxylic acid dimethyl ester.

3. A copolymer of from 70 to 80% by weight of acrylonitrile and from 30 to 20% by weight of bicyclo-[2,2,1]-5-heptene-2,3-dicarboxylic acid diethyl ester.

4. A copolymer of 70 to 80% by weight of acrylonitrile and from 30 to 20% by weight of bicyclo-[2,2,1]-5-heptene-2-carboxylic acid methyl ester.

5. A copolymer of from 70 to 80% by weight of acrylonitrile and from 30 to 20% by weight of bicyclo-[2,2,1]-5-heptene-2-carboxylic acid butyl ester.

6. A polymer consisting of from 70 to 80% by weight of acrylonitrile, from 29 to 12% by weight of bicyclo-[2,2,1]-5-heptene-2,3-dicarboxylic acid dimethyl ester and from 1 to 8% by weight of N-methyl methacrylamide.

7. A solution of a polymer comprising from 65 to 95% by weight of acrylonitrile and from 35 to 5% by weight of a compound selected from the group consisting of those represented by the following formula:

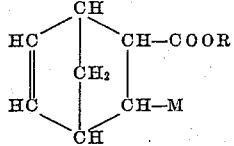

wherein R represents an alkyl group containing from 1 to 4 carbon atoms and M represents a member selected from the group consisting of a hydrogen atom and the group —COOR₁ wherein R₁ represents a member selected from the group consisting of a hydrogen atom and an alkyl group containing from 1 to 4 carbon atoms, in a solvent selected from the group consisting of dimethylformamide, dimethylacetamide, gamma-butyrolactone, ethylene carbonate, ethylene cyanohydrin, succinodinitrile, diethylformamide, diethylacetamide, valerolactone and a 2:1 mixture of acetonitrile and dimethylformamide.

8. A solution of a copolymer of from 70 to 80% by weight of acrylonitrile and from 30 to 20% by weight of bicyclo-[2,2,1]-5-heptene-2,3-dicarboxylic acid dimethyl ester, in dimethylformamide.

9. A solution of a copolymer of from 70 to 80% by weight of acrylonitrile and from 30 to 20% by weight of bicyclo-[2,2,1]-5-heptene-2,3-dicarboxylic acid diethyl ester, in dimethylformamide.

10. A solution of a copolymer of from 70 to 80% by weight of acrylonitrile and from 30 to 20% by weight of bicyclo-[2,2,1]-5-heptene-2-carboxylic acid methyl ester, in diethylacetamide.

11. A solution of a polymer consisting of from 70 to 80% by weight of acrylonitrile, from 29 to 12% by weight of bicyclo-[2,2,1]-5-heptene-2,3-dicarboxylic acid dimethyl ester and from 1 to 8% by weight of N-methyl methacrylamide, in dimethylformamide.

12. A synthetic fiber comprising a polymer of from 65 to 95% by weight of acrylonitrile and from 35 to 5% by weight of a compound selected from the group consisting of those represented by the following general formula:

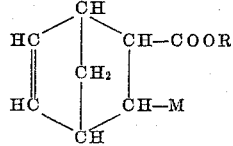

wherein R represents an alkyl group containing from 1 to 4 carbon atoms and M represents a member selected from the group consisting of a hydrogen atom and the group —COOR₁ wherein R₁ represents a member selected from the group consisting of a hydrogen atom and an alkyl group containing from 1 to 4 carbon atoms.

No references cited.